(12) United States Patent
Pehnert et al.

(10) Patent No.: US 10,941,697 B2
(45) Date of Patent: Mar. 9, 2021

(54) COOLING SYSTEM, MOTOR VEHICLE AND METHOD FOR COOLING SAME

(71) Applicant: Dr. Ing. h.c. F. Porsche Aktiengesellschaft, Stuttgart (DE)

(72) Inventors: Bjoern Pehnert, Tamm (DE); Thomas Warbeck, Ludwigsburg (DE); David Kuhn, Uhingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 14/830,006

(22) Filed: Aug. 19, 2015

(65) Prior Publication Data

US 2016/0059668 A1    Mar. 3, 2016

(30) Foreign Application Priority Data

Sep. 2, 2014    (DE) ...................... 10 2014 112 609.2

(51) Int. Cl.
| | |
|---|---|
| *B60H 1/00* | (2006.01) |
| *F01P 11/10* | (2006.01) |
| *F01P 7/10* | (2006.01) |
| *F24F 1/01* | (2011.01) |

(52) U.S. Cl.
CPC .......... *F01P 11/10* (2013.01); *B60H 1/00828* (2013.01); *B60H 1/00842* (2013.01); *F01P 7/10* (2013.01); *F24F 1/01* (2013.01); *B60H 2001/00121* (2013.01)

(58) Field of Classification Search
CPC ............ B60H 1/00835; B60H 1/00842; B60H 1/00849; B60H 1/00857; B60H 2001/00121; F24F 1/01; F24F 13/26
See application file for complete search history.

(56) References Cited

U.S. PATENT DOCUMENTS

| | | | |
|---|---|---|---|
| 5,042,565 A | 8/1991 | Yuen et al. | |
| 2005/0130580 A1 | 6/2005 | Butera et al. | |
| 2006/0070388 A1* | 4/2006 | Yamaguchi | ........ B60H 1/00735 62/186 |
| 2008/0314061 A1* | 12/2008 | Nagami | ............. B60H 1/00378 62/244 |

FOREIGN PATENT DOCUMENTS

| | | | |
|---|---|---|---|
| DE | 198 14 581 | 10/1999 | |
| DE | 100 16 664 | 10/2001 | |
| DE | 10016664 A1 * | 10/2001 | ......... B60H 1/00064 |

(Continued)

OTHER PUBLICATIONS

Voigt Klaus, DE 10016664 A1TRANS (English Translation), Oct. 2001.*

(Continued)

*Primary Examiner* — Eric S Ruppert
(74) *Attorney, Agent, or Firm* — Gerald E. Hespos; Michael J. Porco; Matthew T. Hespos

(57) ABSTRACT

A cooling system (10) for a motor vehicle has an air system that fluidically connects a plurality of coolers (12) for supplying the coolers (12) with cooling air (16). An air fan is arranged fluidically in the air system for conveying the cooling air (16) to the coolers (12). Valves are arranged fluidically in the air system upstream of the coolers (12), for blocking the cooling air (16) conveyed to the respective cooler (12).

3 Claims, 2 Drawing Sheets

(56) References Cited

FOREIGN PATENT DOCUMENTS

| | | | | |
|---|---|---|---|---|
| DE | 101 21 909 | | 11/2002 | |
| DE | 103 10 022 | | 9/2004 | |
| DE | 102008021761 A1 | * | 11/2009 | ............. F28F 13/06 |
| DE | 10 2009 023 671 | | 12/2010 | |
| EP | 0 222 340 | | 5/1987 | |
| EP | 1 236 594 | | 9/2002 | |
| FR | 585411 | * | 2/1925 | ............. F24F 13/26 |
| JP | S5929933 | * | 2/1984 | |
| JP | 4-103927 | | 4/1992 | |
| JP | 04103927 | * | 4/1992 | |
| JP | 07091685 A | * | 4/1995 | ................ F24F 1/01 |

OTHER PUBLICATIONS

Kondo, JP04103927TRANS (English Translation), Apr. 1992.*
Takahashi, JPS5929933MT (English Translation), Feb. 1984.*
German Search Report dated Apr. 20, 2015.
Indian Examination Report dated Jan. 30, 2019.

\* cited by examiner

COOLING SYSTEM, MOTOR VEHICLE AND METHOD FOR COOLING SAME

CROSS REFERENCE TO RELATED APPLICATION

This application claims priority under 35 USC 119 to German Patent Appl. No. 10 2014 112 609.2 filed on Sep. 2, 2014, the entire disclosure of which is incorporated herein by reference.

BACKGROUND

1. Field of the Invention

The present invention relates to a cooling system for a motor vehicle. The invention further relates to a method for using a cooling system of this type, to a corresponding computer program and to a machine-readable storage medium with such a program.

2. Description of the Related Art

Systems for supplying coolers or radiators in a motor vehicle with cooling air are known in vehicle engineering. These systems direct a flow of cooling liquid through a cooler and cool the cooling liquid by cooling air flowing there through. Thus, the cooling liquid can be supplied again to a cooling system. A fan customarily is located upstream of the cooler for sucking up the air so that a constant quantity of air—substantially corresponding to the driving speed—flows through each cooler in the vehicle. The geometry of the fan results in severe blockage of the air in the direction of the engine compartment. Furthermore, the fan is limited in capacity by the size thereof. This overall size is directed in turn in accordance with the package in the region of the cooler and therefore sometimes is limited significantly.

DE 101 21 909 B4 discloses a ventilation device for vehicles in conjunction with a heating or air-conditioning system, air flow ducts and at least one air vent having devices for controlling the direction and the quantity of air. The devices for controlling the quantity of air and for controlling the air direction of the air vent can be actuated electrically. The devices for controlling the air direction and/or quantity of air are moved by electric motors, preferably stepping motors or D.C. motors. At least two functions of the air vent are designed as modules for linking to further modules in conjunction with a supply on the basis of an increased electrical system voltage, in particular 42 V.

EP 1 236 594 B1 proposes a vehicle roof with a roof part with a transparent window. At least one outlet is arranged to the side of the window, and at least one air-guiding duct conducts an air flow onto the lower side of the window. The air flow can be heated or cooled by an apparatus. The air-guiding duct is formed exclusively on a frame surrounding the roof part or on a component that is fastened to the frame and surrounds the roof part. At least one electric fan is arranged in the air-guiding duct or ducts.

US 2005/0130580 A1 discloses an air distribution system for the dashboard of a motor vehicle. The system has a main duct that receives an air flow from a source of air-conditioned air. Auxiliary ducts branch off from the main duct and end in air discharge openings on the dashboard. The main duct leads into a distributor or rail from which a number of auxiliary ducts branch off. Each auxiliary duct that branches off from the distributor branches into a number of end ducts that lead to respective discharge openings of the dashboard. Each of the auxiliary ducts has an air distribution apparatus for distributing the air flow that flows through the auxiliary duct under the end ducts that branch off therefrom and each auxiliary duct is assigned an independent additional unit that regulates at least one property of the air flow passing through the auxiliary duct.

U.S. Pat. No. 5,042,565 discloses a heat exchanger with a composite structure that is reinforced by plaited fibers. An inlet edge has a copper assembly reinforced by plaited graphite fibers and formed as an independent, integral unit by means of inlet and outlet lines and a means forming passages connect the lines.

EP 0 222 340 B1 relates to a method for air conditioning a room that includes blowing air through air outlets arranged at predetermined positions in the room to form a multiplicity of circulating air flows. The method comprises a first step of changing the region of effect of at least one of the circulating flows, a second step of returning the circulating flow changed in the first step to the original region of action thereof, and repeating the first and second steps successively.

SUMMARY

The invention relates to efficient cooling air management that includes switching off an individual cooler or radiator that is not required, thereby saving energy and relieving the electrical supply of the vehicle of load. By focusing the air flow from the central fan, significantly more air can be provided per cooler than with the conventional individual fan system. Thus, the quantity of air flowing through a cooler is not absolutely dependent on the driving speed of the vehicle, but rather can be controlled in a targeted manner by valves. The central fan has a geometrical flexibility that overcomes the prior art problem of severe blockage of the cooling air in the direction of the engine compartment. Additionally, the geometrical flexibility permits a fan size that is entirely independent of the package in the region of the cooler and enables the constructor to adapt the capacity of the fan in a targeted manner to the requirements of the application by suitable dimensioning.

Cooling air openings are arranged fluidically in the air system between the valves, and the coolers for supplying the cooling air to the respective cooler can be provided with an annular gap that encircles each cooling air opening for accelerating the cooling air supplied to the respective cooler. The fans mounted upstream of the individual coolers according to the conventional approach are replaced by the annular gap mentioned, which leads to a considerable saving on weight.

The annular gap may have a cross section that tapers fluidically in the direction of the air guide for sucking up the cooling air via the cooling air opening. The annular gap with a cross section that becomes narrower accelerates the cooling air from the central air system particularly efficiently, and produces a negative pressure that generates suction that sucks up further cooling air via the cooling air opening.

A control unit may be connected electronically to the valves for activating the valves. Thus, each cooler can be activated individually and can be supplied in a targeted manner with the respectively required air flow.

An exemplary embodiment of the invention is illustrated in the drawings and described in more detail below.

DETAILED DESCRIPTION

Figure 1:
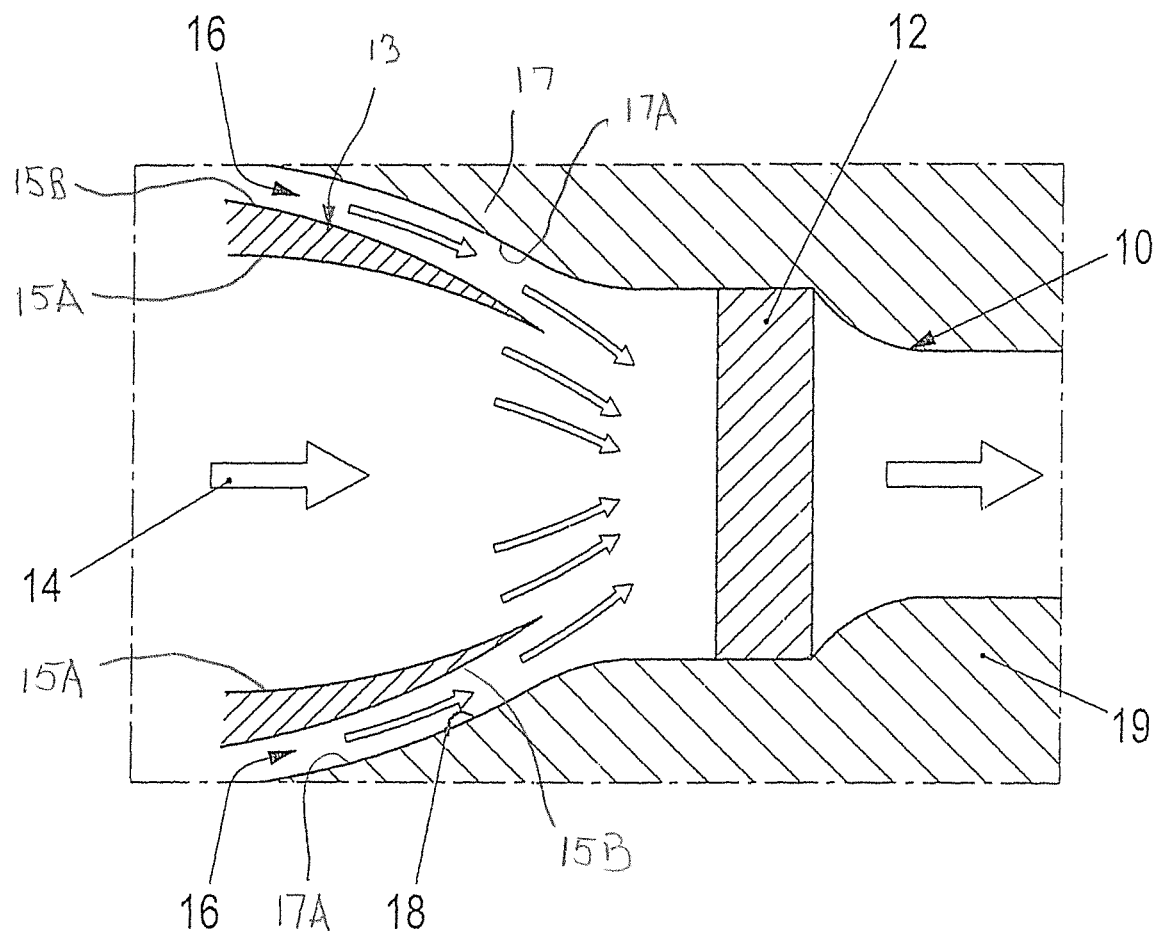
FIG. 1 is a sectional illustration of a cooling system, illustrated merely in regions, according to an embodiment of the invention.

FIG. 1 illustrates, with reference to a partial section, the structural design of a cooling system 10 according to an embodiment of the invention. The cooling system 10 has four coolers or radiators for cooling the vehicle. FIG. 1 reproduces by way of example the detail of one of the coolers 12.

FIG. 1 shows a cooling air opening 14 that is mounted fluidically upstream of the cooler 12 for supplying the cooling air 16 to the cooler 12. More particularly, an annular wall 13 is disposed upstream of the cooler 12 and has an inner circumferential surface 15A that defines the cooling air opening 14. The inner circumferential surface 15A of the annular wall 13 tapers to smaller radial dimensions in a downstream direction. An encircling wall 17 is spaced out from the annular wall 13 and defines an annular gap 18 between an outer circumferential surface 15B of the annual wall 13 and an inner circumferential surface 17A of the encircling wall 17. The cross-sectional area of the annular gap between the inner circumferential surface 17A of the encircling wall 17 and the outer surface of the annular wall 13 tapers to smaller dimensions in a downstream direction. Thus, the annular gap 18 that encircles the cooling air opening accelerates the cooling air 16 supplied to the cooler 12. The inner and outer surfaces that form the annular gap 18 taper in the direction of the air guide 19, thereby sucking up of the cooling air 16 via the cooling air opening 14 in the direction of the cooler 12. Additionally, an air guide 19 is arranged fluidically downstream of the cooler 12 for removing the cooling air 16 supplied to the cooler 12.

Figure 2:
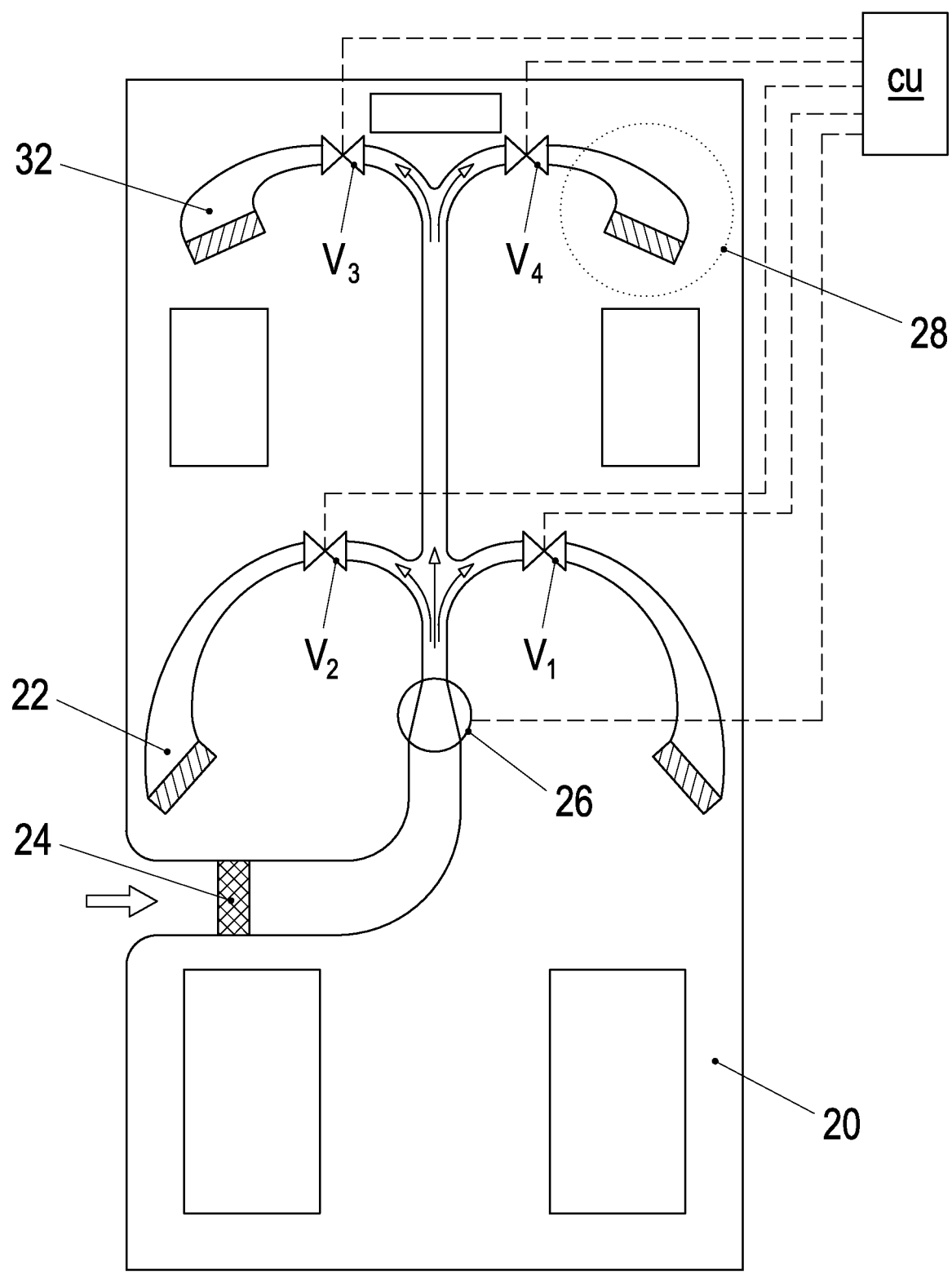
FIG. 2 is a sectional illustration of a motor vehicle with the cooling system according to FIG. 1.

The superior sectional illustration of FIG. 2 reproduces the correspondingly equipped motor vehicle 20 in its entirety and clarifies the functional interaction of the structural components. The detail 28 corresponds approximately to the partial region of the cooling system 10 that is illustrated in FIG. 1. A total of four coolers 12, 22, 32 through which cooling liquid flows are illustrated and are constructed according to FIG. 1. The coolers are supplied and cooled with cooling air 16 that is sucked up by an air filter 24, by a cooling system 10 that fluidically connects the coolers 12, 22, 32.

An air fan 26 is arranged fluidically in the air system and conveys the cooling air 16 to the coolers 12, 22, 32. Valves V1, V2, V3, V4 are arranged fluidically in the air system upstream of the coolers 12, 22, 32 for selectively blocking the cooling air 16 conveyed to the coolers 12, 22, 32. A cooling or control unit CU is connected electronically to the valves V1, V2, V3, V4 and controls the valves so that the cooling air 16 conveyed to unused coolers 12, 22, 32 is blocked. For this purpose, the control unit CU is configured, for example, by a corresponding computer program (not illustrated graphically) that can be stored on a suitable machine-readable storage medium, for example the RAM or ROM of a microcontroller installed in the control unit CU.

What is claimed is:

1. A cooling system for a motor vehicle, comprising:
an air system having a single inlet for receiving cooling air, the single inlet being connected fluidically to each of a plurality of coolers for supplying the cooling air from the single inlet to the respective coolers via cooling air openings upstream of the respective coolers and downstream of the single air inlet;
a single air fan arranged fluidically in the air system upstream of the coolers for conveying the cooling air from the single inlet to the respective coolers;
valves arranged fluidically in the air system downstream of the single air fan and upstream of the respective coolers for selectively blocking the cooling air from being conveyed from the single inlet to the respective cooler;
a control unit electronically connected to the single air fan and the valves for activating the valves and distributing the cooling air from the single air fan to plurality of coolers;
air guides arranged fluidically in the air system downstream of the respective coolers for removing the cooling air supplied to the respective cooler;
encircling walls arranged fluidically in the air system upstream of the respective coolers and between the respective coolers and the valve that is upstream of the respective cooler, each of the encircling walls having an inner circumferential surface defining an inside diameter tapering continuously inward from an upstream end to a downstream end and accommodating a first part of the cooling air flowing from the respective valve to the respective cooler; and
annular walls arranged fluidically in the air system inward of the respective encircling walls, each of the annular walls having an outer circumferential surface facing the inner surface of the respective encircling wall and defining an annular gap between the respective encircling wall and the annular wall, the annular gap accommodating a second part of the cooling air flowing from the respective valve to the respective cooler so that the cooling air impinging on each of the respective coolers is a sum of the first part and the second part of the cooling air flowing from the respective valve, the outer circumferential surface of each of the annular walls having an outside diameter that tapers continuously in a downstream direction so that a cross-sectional area of the annular gap formed between the annular wall and the respective encircling wall tapers continuously to smaller cross-sectional areas in a downstream direction toward the respective cooler for sucking up the cooling air via the respective cooling air opening and accelerating the cooling air supplied to the respective coolers.

2. The cooling system of claim 1, further comprising an air filter upstream of the air fan.

3. The cooling system of claim 1, wherein each of the air guides tapers to smaller cross-sectional dimensions at a position downstream of the respective cooler.

* * * * *